United States Patent [19]

Ochs et al.

[11] Patent Number: 5,377,962
[45] Date of Patent: Jan. 3, 1995

[54] ROTATIONAL VIBRATION DAMPER

[75] Inventors: Winfried Ochs, Alsbach-Hähnlein; Jürgen Eichhorn, Weinheim-Sulzbach, both of Germany

[73] Assignee: Firma Carl Freudenberg, Weinheim/Bergstr., Germany

[21] Appl. No.: 55,733

[22] Filed: Apr. 30, 1993

[30] Foreign Application Priority Data

Aug. 8, 1992 [DE] Germany ............................ 4228350

[51] Int. Cl.⁶ .......................................... B60G 11/23
[52] U.S. Cl. .............................. 267/281; 267/141.3; 267/292
[58] Field of Search ................. 267/141.1, 141.2, 154, 267/279, 280, 281, 282, 293; 384/220, 222, 292, 293, 297

[56] References Cited

U.S. PATENT DOCUMENTS

| | | | |
|---|---|---|---|
| 3,689,052 | 9/1972 | Carnell | 267/279 |
| 3,976,338 | 8/1976 | Trachte et al. | 384/220 |
| 3,976,342 | 8/1976 | Leyendecker et al. | 384/293 |
| 4,671,678 | 6/1987 | Munch | 384/222 |
| 4,744,677 | 5/1988 | Tanaka et al. | 267/279 |
| 4,809,960 | 3/1989 | Kakimoto et al. | 267/281 |
| 4,826,145 | 5/1989 | Moore et al. | 267/154 |
| 4,900,165 | 2/1990 | Kun et al. | 384/220 |
| 5,100,114 | 3/1992 | Reuter et al. | 267/293 |
| 5,143,456 | 9/1992 | Jordens et al. | 384/222 |
| 5,165,803 | 11/1992 | Zivkovic | 384/222 |
| 5,263,778 | 11/1993 | Jordens et al. | 384/293 |

Primary Examiner—Robert J. Oberleitner
Assistant Examiner—Chris Schwartz
Attorney, Agent, or Firm—Felfe & Lynch

[57] ABSTRACT

An inside ring (1) and an outside ring (2) are mounted about a common axis (3) and are joined to one another in a rotationally elastic manner by at least one elastic body (4) of elastomeric material. The elastic body (4) is bonded only to one of the rings (1, 2) and is supported in a relatively rotatable manner on the other ring (2, 1) by at least one friction layer (7) to limit the transmittable torque.

26 Claims, 3 Drawing Sheets

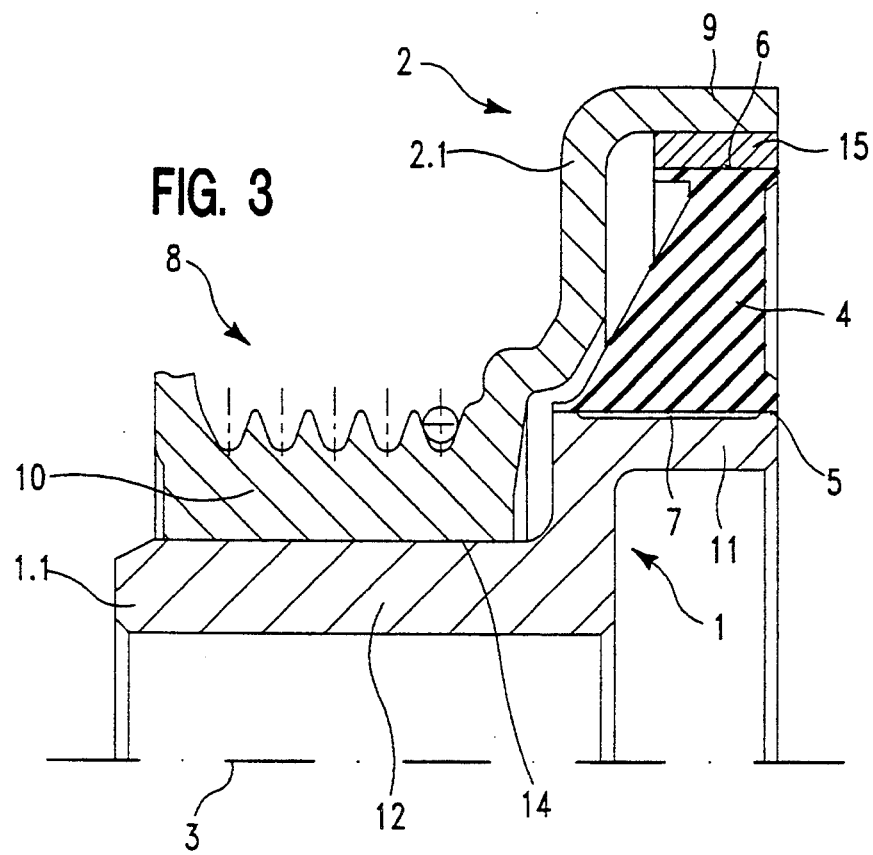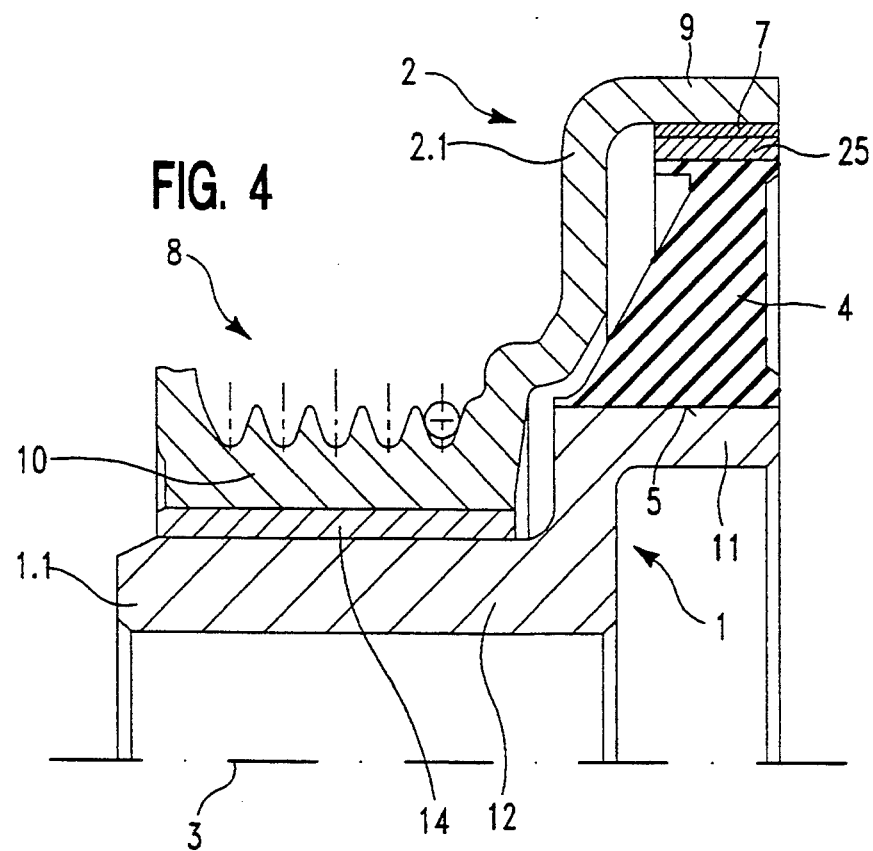

5,377,962

ROTATIONAL VIBRATION DAMPER

BACKGROUND OF THE INVENTION

The invention relates to an elastic coupling comprising an inside ring, plus an outside ring at least partially encompassing the inside ring, the inside and outside rings being mounted for rotation relative to one another about a common axis and being joined together in a torsionally elastic manner by at least one elastic body of elastomeric material.

Such an elastic coupling is disclosed in DE-OS 39 13 547. The torsional vibration damper shown therein includes a rubber elastic system which is associated both with the rotating ring and with the hub ring in a relatively nonrotating manner in the area of their circumferential surfaces. The rubber elastic system is configured as a circumferential ring which is vulcanized at its inner side to the outer circumferential surface of the hub, and is provided on its outside with a metal sleeve vulcanized to it. The metal sleeve is pressed into the receiving opening of the rotating ring. Furthermore, the previously known coupling has slide ribs which project radially from one of the rings and are supported on the other ring. The slide ribs are associated with the rubber elastic system at an axial distance from it, so as to prevent the wobbling of the rotating ring. It is to be noted, however, that the elastomer must be made from low-damping mixtures for the best possible isolation. When passing through resonance, and at peak torques, this results in very great relative turning of the hub ring with respect to the rotating ring. Due to the high mechanical stresses on the elastic body, and to tensional stresses in the area of the adhered circumferential surfaces and shear stresses within the elastic body, the dynamic properties of the previously known coupling over a long period of use are not very satisfactory.

Furthermore, it is known that, in order to limit the relative rotation between the hub ring and the rotating ring, for example upon the introduction of peak torques, abutments are provided which limit the relative rotation when an allowable turning angle is exceeded. A disadvantage of couplings provided with abutments is the greater expense of production and the irregular transition between the relative rotation of the two rings and the sudden collision limiting the torque peaks. Collision with the abutments is usually accompanied by noise, which is undesirable.

The invention is addressed to the problem of further improving an elastic coupling of the prior art such that a elastic body of low-damping material can be used, which has good dynamic properties over a long period of use even if torque peaks occur frequently, and such that the limiting of the mechanical stress on the elastic body will occur without generating noise.

SUMMARY OF THE INVENTION

The elastic body is fixed to only one of the rings, and is held on the other ring in a relatively rotatable manner by at least one slipping layer for limiting the transmittable torque. It is advantageous that, for a good isolation an elastic body of low-damping material can be used, without any reduction of the useful life during proper use. If peak torques are introduced, for example upon passing through resonance, the limitation of the transmittable torque is performed by the given sticking torque and slipping torque of the slipping layer that is used. Mechanical overstressing of the elastic body can thereby be reliably prevented. Furthermore, a softer, more uniform transition occurs between the transmittable sticking torque and the slipping torque.

Clashing noises and abrupt limiting of the relative movement of the inside ring and outside ring do not occur in this configuration.

The inside ring can be the hub ring and the outside ring the rotating ring. The elastic body may be adhered and relatively nonrotatable only with respect to the hub ring or only with respect to the rotating ring.

The hub ring and/or the rotating ring can be in the form of a belt pulley. By making the belt pulley integral with one of the rings an advantageous configuration is achieved from the production point of view. The number of separate parts is not increased thereby, and this is an outstanding advantage as regards ease of assembly and from the economical viewpoint.

In an advantageous embodiment, the elastic body is annular and has an outer circumferential surface which encompasses an inside circumferential surface, and the elastic body is disposed under resilient bias in the radial direction between the hub ring and the rotating ring. This embodiment results in compact dimensions in the axial direction.

It is possible for the slipping layer to be disposed either between the hub ring and the elastic body or between the rotating ring and the elastic body. If the slipping layer is between the hub ring and the elastic body, the result will be a relatively small contact area between the hub ring and the elastic body for the same axial width of the coupling. On the other hand, if the coupling slips, a relatively low relative velocity of the surfaces in contact with respect to one another is obtained, which is favorable to longer useful life.

If the slipping layer is disposed between the rotating ring and the elastic body, on the other hand, due to the relatively increased surface area of the parts moving relative to one another, if the dimension of the coupling in the axial direction is otherwise the same, a greater transferrable sticking torque is assured, but if the coupling slips the result will be comparatively higher circumferential velocities. The configuration can be adapted to the circumstances of the particular application.

If the slipping layer is disposed between the hub ring and the elastic body, the elastic body can be cemented on the side facing the rotating ring to a sleeve of metallic material which is held under radial bias in the rotating ring. On the side facing the hub ring the elastic body is joined to the hub ring at its inner circumferential surface without adhesive.

The elastic body can be integrally merged with the slipping layer on the side facing the hub ring, while the slipping layer has a given sticking torque on the hub ring.

The slipping layer can be constituted directly by the elastomeric material of the elastic body. The slipping layer is in contact at least in partial areas with the surface of the adjacent ring, and can have various coefficients of friction depending on the circumstances of the application.

The slipping layer can be formed, for example, by a slipping film which is associated with the inside or outside circumferential surface of the elastic body in a relatively nonrotatable and adherent manner. In this case it is advantageous for the slipping film to consist of a wear-resistant material thereby providing the coupling with uniformly good practical characteristics over a long period of use. Thus no direct contact takes place between the elastomeric material of the elastic body and the adjacent surface of the sometimes slipping ring.

In another embodiment the slipping layer can be formed by a slipping film which is associated in a relatively nonrotatable manner with the outer circumferential surface of the hub ring or the inner circumferential surface of the rotating ring. With this embodiment, for example, a high surface quality of the rings facing the elastic body is unnecessary, thereby making production more economical. The relative rotation takes place in this case between the slipping film and the elastomeric elastic body.

The coupling can include an angular piece having a tubular portion concentric to the axis and a radial flange, thus exhibiting an L-shaped cross section. The tubular portion is preferably fixed to the outside of the elastic body. In the axial direction between the radial flange and a flange-like radial projection of the belt pulley there is disposed the slipping layer which is disposed under axial bias between the radial flange and the belt pulley. This embodiment is used preferably whenever small dimensions in the radial direction are required.

The support of the hub ring and rotating ring on one another can be provided in addition to support via the elastic body by a bearing which is disposed in the axial length of the coupling.

The bearing can be a rolling bearing. In this case it is advantageous that a low-friction, easy relative rotation of hub ring and rotating ring is made possible. In another embodiment provision can be made for the rotating ring and the hub ring to be supported on one another by a friction bearing. In this case it is advantageous that the coupling will have a low height in the radial direction, and will be simple to install and economical to manufacture. If a friction bearing is used the hub ring and/or the rotating ring can be provided with a friction-reducing surface coating disposed in the direction of the other ring. In addition there is the possibility for at least one of the two surfaces facing one another to be provided with lubricant pockets which can be filled with grease. For a design with a minimum of parts, the hub ring and the rotating ring can be formed by a steel/bronze pairing of materials, the hub ring being preferably made of steel and the rotating ring of a bronze alloy with good antifriction qualities.

To prevent wobbling, the hub ring and rotating ring can be supported slidingly on one another by flanges extending radially, in addition to the elastic body. At least a first flange projecting radially outwardly can be associated with the hub ring, and at least a second flange projecting radially inwardly can be associated with the rotating ring, with the flanges in sliding contact with radially adjacent surfaces of the adjacent ring. In the case of a one-piece elastic body running around the circumference between the hub ring and the rotating ring, the flanges can be associated adjacent the elastic body at an axial distance therefrom, while in the case of elastic bodies distributed uniformly between the rings in the circumferential direction the flanges can be disposed within the space defined by the circumferentially adjacent elastic bodies. The fixed relationship of the flanges is on the ring with which the elastic body is also associated in a relatively nonrotatable and cemented manner.

The advantage of the coupling according to the invention consists in the good isolation of vibrations by the use of a low-damping elastomer mixture for the elastic body and in a limiting of the transmittable torque for the improvement of the practical properties of the coupling over a long period of use. The largely smooth transition between locked friction and sliding friction results in good practical properties while avoiding undesirable noise.

BRIEF DESCRIPTION OF THE DRAWINGS

FIG. 3 is a partial axial section showing a third embodiment, wherein a friction bearing serves for the radial support between the hub ring and the rotating ring, and the elastic body is rotatably supported on the hub ring without the interposition of a separately produced friction layer, FIG. 4 is a partial axial section showing a fourth embodiment wherein a friction sleeve is pressed into the rotating ring so as to be relatively nonrotatable and encompasses the hub ring so as to be relatively rotatable.

DETAILED DESCRIPTION OF THE PREFERRED EMBODIMENTS

Figure 1:
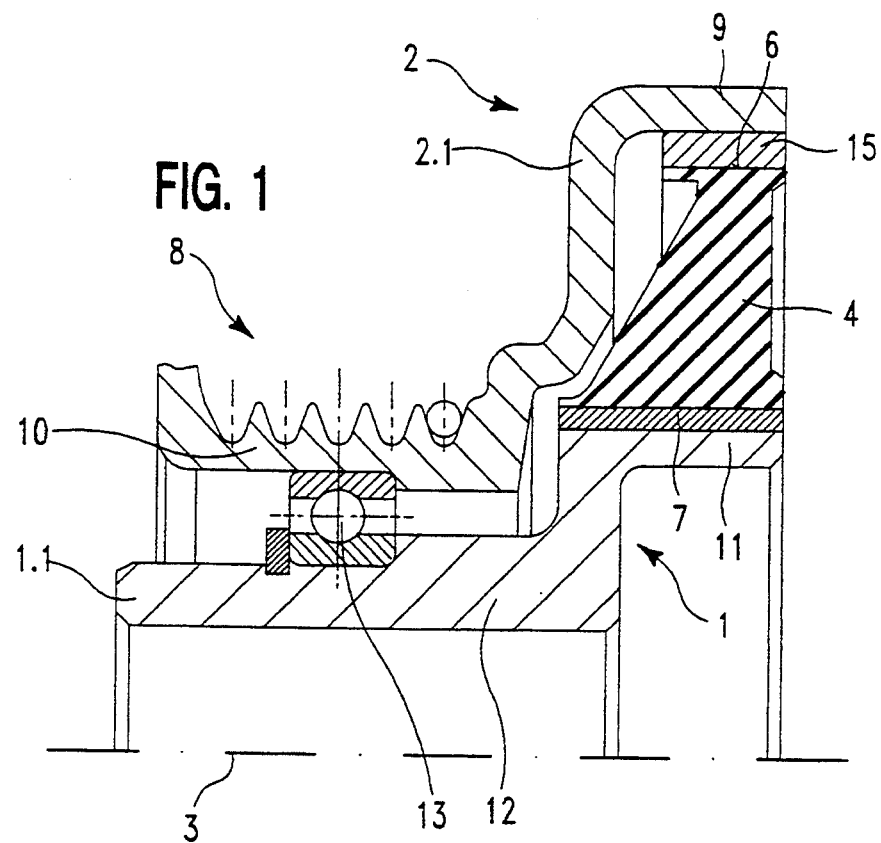
FIG. 1 is a partial axial section showing a first embodiment in which the elastic body is affixed in a relatively nonrotatable and cemented manner only to the rotating ring.

In each of FIGS. 1 to 4 there is shown an embodiment of an elastic coupling which includes a hub ring 1 and a rotating ring 2 disposed for rotation relative to one another about a common axis 3, an elastic body 4 being associated with the hub ring 1 by its inner circumferential surface 5 and with the rotating ring 2 by its outer circumferential surface 6. In the embodiments in FIGS. 1 to 4 only one of the circumferential surfaces 5 or 6 is associated with the radially adjacent ring 1 or 2 in a relatively nonrotatable manner and bonded, for example, by vulcanization. The other circumferential surface 6 or 5 of the elastic body 4 is associated with the other radially adjacent ring in an unbonded manner, so that the torque that can be transmitted is limited. If the moment of adhesion is exceeded, the hub ring 1 and the rotating ring 2 slip on one another via the friction layer 7. Slippage of the coupling is intended, for example, in the case of passing through resonance with great vibration amplitudes and for the reduction of torque peaks in order to avoid very great relative angles between the inner circumferential surface 5 and the outer circumferential surface 6 of the elastic body and thereby reduce the mechanical stresses and increase the useful life of the entire coupling. After the passage through resonance, or in the case of the proper use of the coupling within the maximum permissible, pre-established sticking torque, a good isolation of introduced vibrations is assured by the low-damping material mixture of the elastic body 4.

In the embodiments here shown, the rotating ring 2 is in the form of a belt pulley and supported on the hub ring 1 along its axial length by a bearing. The hub ring 1 and the rotating ring 2 in these embodiments have an S-shaped profile matched to one another, the outer ring having an outer limb 9 and an inner limb 10, the inner ring having an outer limb 11 and an inner limb 12. The radially outer limb or collar portion 9 passes around the outside of the elastic body 4 and the radially inner limb or pulley portion 10 is provided on the outside with a profile 8 to accommodate a belt. This configuration results in small dimensions of the coupling in the radial direction and in the avoidance of tension and pressure stresses on the elastic body 4, since the belt forces are taken up by the bearing between the hub ring 1 and the rotating ring 2 axially outside of the elastic body 4. Other configurations of the hub ring 1 and rotating ring 2 are conceivable. For example, the use of a rotating ring 2 which is not a belt pulley and/or a hub ring 1 which has a shape for the accommodation of a belt.

In FIG. 1 the elastic body 4 is fastened with adhesive at its outer circumferential surface 6 to a metal sleeve 15, while the inner circumferential surface 5 of the elastic body 4 is vulcanized directly onto the slipping layer 7 in the form of a slipping film. The rotating ring 2, which is in the form of a belt pulley, is held radially on the inner limb 12 of hub ring 1 by a ball bearing 13 which is disposed in the center of the axial length of the belt pulley 8. This configuration assures that the ball bearing 13 is stressed substantially only in the radial direction and prevents tilting of the rotating ring 2 and hub ring 1 relative to one another. The elastic body 4 with the sleeve 15 vulcanized onto it is pressed into the outer limb 9 of rotating ring 2 and is thus unrotatable relative to the latter. The torque that can be transferred is limited by the maximum friction between the friction layer 7 and the hub ring 1. Depending on the circumstances of the application, the friction coefficients may differ, and hence the maximum torque that can be transferred. If the sticking friction established by design is exceeded by torque peaks, for example, a relative movement occurs between the friction layer 7, which is associated with the elastic body 4 in a relatively nonrotatable manner and adhesively, and the hub ring 1. If the torque to be transferred then falls below the maximum friction, a frictionally driving connection between the friction layer 7 and the hub ring 1 is restored.

Figure 2:
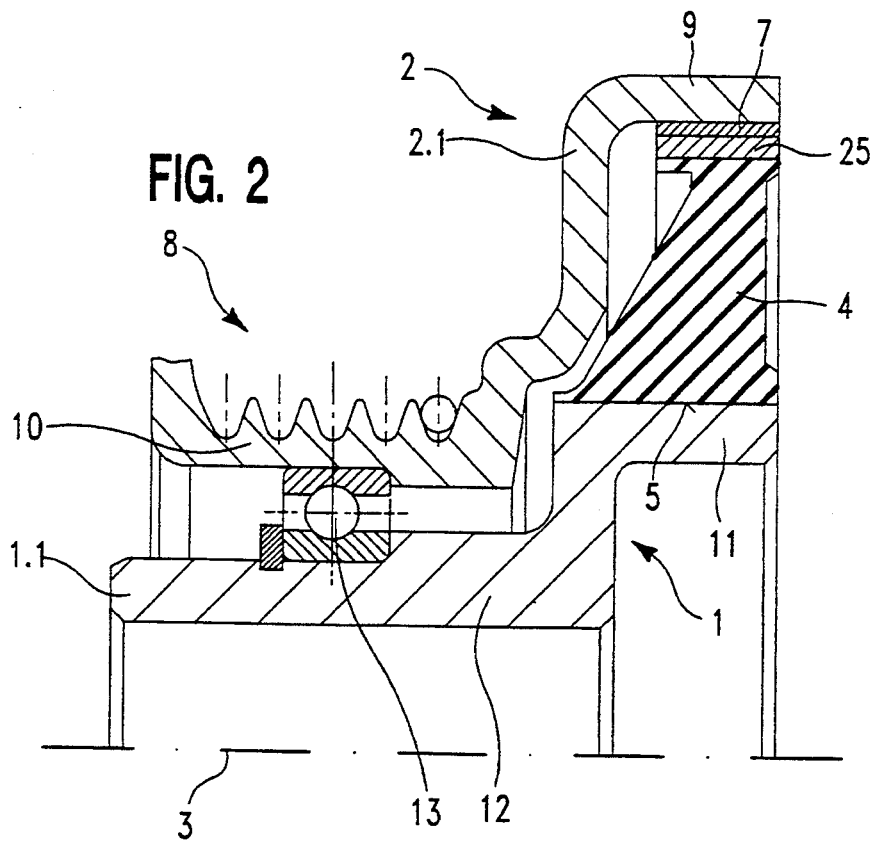
FIG. 2 is a partial axial section showing a second embodiment wherein the elastic body is vulcanized onto the hub ring and is rotatable relative to the rotating ring when the threshold torque is exceeded.
Figure 4A:
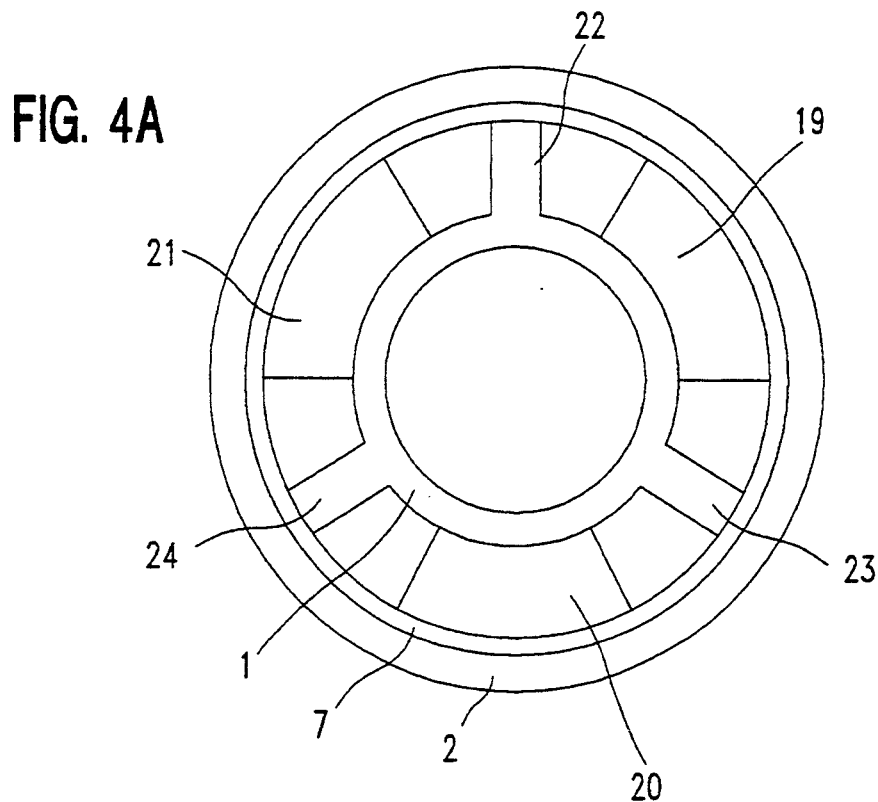
FIG. 4A is an end section of a fifth embodiment showing an elastic supporting body in three sections.

FIG. 2 shows an elastic coupling similar to the embodiment in FIG. 1, wherein the friction layer 7 is disposed between a sleeve 25 on the outer circumferential surface 6 of the elastic body 4 and the rotating ring 2.

The elastic body 4 is bonded with adhesive in a relatively nonrotatable manner to the hub ring 1. The friction layer 7 is formed in this embodiment by a friction bearing bush consisting of a known antifriction bearing material, which is pressed into the rotating ring 2. The antifriction material chosen depends on the material of the opposed surface, in this case ring 25. If the opposed surface is steel, the layer 7 is preferably PTFE or bronze. In a different embodiment than the one shown here, when a sleeve 25 of friction bearing material is used, the possibility exists for supporting the sleeve 25 directly within the rotating ring 2, so that, when a given moment of adhesion is exceeded, the hub ring 1 and rotating ring 1 and 2 can slip on one another.

FIG. 3 shows an embodiment similar to the one in FIG. 1, wherein the surfaces that are rotatable relative to one another are formed by the outer limb 11 of the hub ring 1 and by the inner circumferential surface 5 of the elastic body 4. In this embodiment the elastomer of the elastic body 4 is used as the friction layer 3, and lubricant pockets 17 can be provided within the outer limb 11 of the hub ring 1 to reduce abrasive wear. By design, the torque that can be transmitted by an elastic coupling according to FIG. 3 is comparatively low. The belt pulley 8 is supported on the hub ring 1 in this example by a friction bearing, the rotating ring 2 being made of a bronze alloy and supported on a hub ring 1 of steel. To reduce wear and achieve easier relative movement between rotating ring 2 and hub ring 1 at the belt pulley 8, lubricant pockets 18 filled with grease can be provided in at least one of the two rings 1, 2. Both pockets 17 and 18 are configured as grooves, parallel to the axis of the bearing.

In FIG. 4 there is shown an embodiment which differs from the one in FIG. 2 only in that, instead of the ball bearing 13, a bronze friction bearing 14 is used, which is in the form of a sleeve.

The elastic bodies 4 represented in FIGS. 1 to 4 are of an annular configuration. FIG. 4A shows three elastic bodies 19, 20, 21 distributed uniformly around the circumference and spaced circumferentially apart. Within the circumferential space which is defined by the elastic bodies a support of hub ring 1 and rotating ring 2 can be provided. If the elastic bodies are bonded to the rotating ring and associated relatively unrotatably therewith, additional support in the form of projections is associated relatively unrotatably with the rotating ring 2 and rests slidingly on the hub ring 1. If the elastic bodies are unrotatable with and bonded to the hub ring 1, the projections 22, 23, 24 are supported unrotatably on the hub ring 1 and are relatively rotatable and slidingly associated with the friction surface 7 bonded to the rotating ring 2 as shown. Any impairment of the advantageous practical properties can thereby be avoided.

Figure 5:
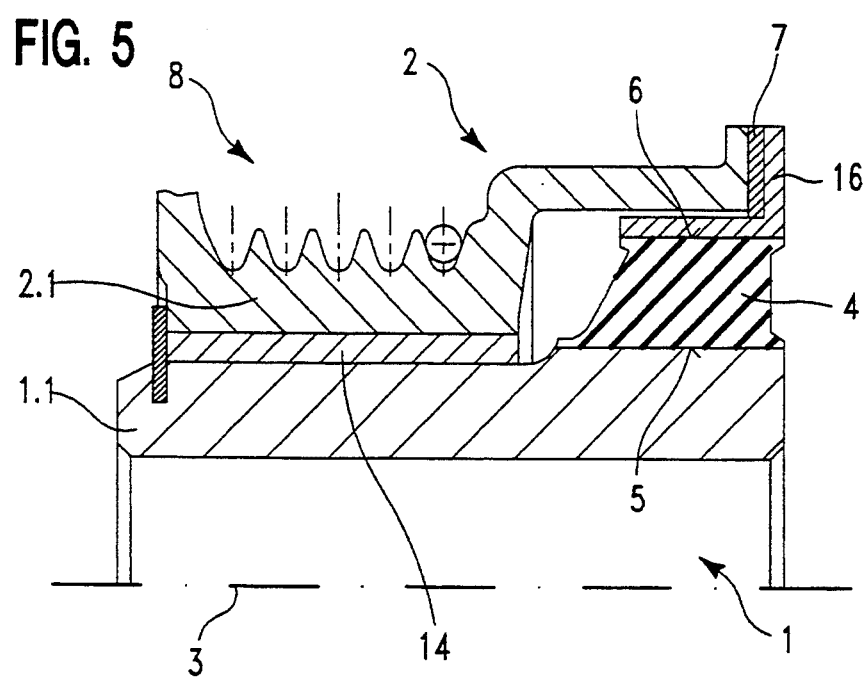
FIG. 5 is a partial axial section showing a fifth embodiment wherein the friction layer for limiting the transmittable torque is disposed axially under axial bias between an L-shaped profile which is held nonrotatably on the elastic body and a flange projecting from the belt pulley.

In FIG. 5 an angular piece 16 is associated with the elastic body 4 on its outer circumference and is unrotatable relative thereto. The friction layer 7 can, as here represented, for example, be annular and bonded fixedly to the radial flange of the piece 16. For additional friction, a friction sleeve 14 can be fitted between the hub ring 1 and the pulley portion of the outer ring 2 as shown. A different configuration, for example an angular piece 16 of a bronze alloy urged under axial bias against the radial projection of the belt pulley, is also conceivable.

We claim:

1. Rotational vibration damper comprising
a hub ring having an outside surface,
a rotating ring outside of said hub ring and having an inside surface concentric to said outside surface of said hub ring,
a friction layer fixed relative to one of said inside surface and said outside surface,
an elastomeric body fixed relative to the other of said inside surface and said outside surface, and supported by said friction layer so that said rotating ring rotates with said hub ring unless slippage occurs at said friction layer, and
a bearing situated between said hub ring and said rotating ring.

2. Rotational vibration damper as in claim 1 wherein said friction layer is disposed between said rotating ring and said elastomeric body.

3. A rotational vibration damper as in claim 2 further comprising a metal sleeve fixed to said elastomeric body between said elastomeric body and said friction layer.

4. A rotational vibration damper as in claim 3 wherein said friction layer is fixed to said metal sleeve.

5. Rotational vibration damper as in claim 2 wherein said friction layer is formed by the elastomeric body itself.

6. Rotational vibration damper as in claim 1 wherein said friction layer is fixed to said hub ring.

7. Rotational vibration damper as in claim 6 wherein said elastomeric body bears directly against said friction layer.

8. Rotational vibration damper as in claim 1 wherein said rotating ring is a belt pulley.

9. Rotational vibration damper as in claim 8 wherein said belt pulley comprises a collar portion and a pulley portion, said collar portion being disposed concentrically to said elastomeric body, said pulley portion being disposed concentrically to said hub ring, said damper further comprising a bearing directly between said pulley portion and said hub portion.

10. Rotational vibration damper as in claim 1 wherein said friction layer is a discrete layer fixed unrotatably to said elastomeric body.

11. Rotational vibration damper as in claim 1 further comprising a metal sleeve press fit into said rotating ring, said elastomeric body being bonded to said metal sleeve.

12. Rotational vibration damper as in claim 1 wherein said elastic body is an annular body disposed between said hub ring and said rotating ring.

13. Rotational vibration damper as in claim 1 wherein said bearing is a roller bearing.

14. Rotational vibration damper as in claim 1 wherein said bearing is a bronze sleeve.

15. Rotational vibration damper as in claim 1 wherein said friction layer is a bronze sleeve.

16. Rotational vibration damper as in claim 1 wherein said friction layer is a sleeve of PTFE.

17. Rotational vibration damper comprising
a hub ring,
a rotating ring disposed concentrically with said hub ring, said rotating ring having a radially inner limb and a radially outer limb of larger diameter than said inner limb,
an elastomeric body between said hub ring and said outer limb and fixed to one of said hub ring and outer limb,
a friction layer between said elastomeric body and the other of said hub ring and said outer limb, said friction layer being fixed relative to one of said elastomeric body and the other of said hub ring and said outer limb, and
a bearing disposed directly between said inner limb and said hub ring.

18. Rotational vibration damper as in claim 17 further comprising a metal sleeve press fit into said outer limb, said elastomeric body being bonded to said metal sleeve.

19. Rotational vibration damper as in claim 18 wherein said friction layer is fixed to said elastomeric body between said elastomeric body and said hub ring.

20. Rotational vibration damper as in claim 17 wherein said elastomeric body is bonded to said hub ring, said friction layer being disposed between said elastomeric body and said outer limb.

21. Rotational vibration damper as in claim 20 further comprising a metal sleeve bonded to said elastomeric body between said elastomeric body and said outer limb, said friction layer being bonded to said metal sleeve.

22. Rotational vibration damper as in claim 17 wherein said inner limb is profiled to accommodate a belt.

23. Rotational vibration damper as in claim 17 wherein said hub ring is steel and said rotating ring is bronze.

24. Rotational vibration damper as in claim 21 wherein said bearing is disposed axially midway along said inner limb.

25. Rotational vibration damper as in claim 17 wherein said hub ring has a radial inner limb concentric to said radial inner limb of said rotating ring, and a radial outer limb concentric to said radial outer limb of said rotating ring, said radial outer limb of said hub ring having a larger diameter than said radial inner limb of said hub ring.

26. A rotational vibration damper comprising
an inner tubular ring,
an outer tubular ring situated concentrically to said inner tubular ring,
an elastomeric body fixed to said inner tubular ring between said inner tubular ring and said outer tubular ring,
an angular piece having a tubular portion fixed to said elastomeric body between said elastomeric body and said outer tubular ring, and a radial flange spaced axially from said outer tubular ring,
a friction layer fixed to one of said outer tubular ring and said radial flange, said friction layer being disposed under axial bias against the other of said outer tubular ring and said radial flange, and
a friction sleeve disposed directly between said inner tubular ring and said outer tubular ring, said friction sleeve being axially remote from said elastomeric body.

* * * * *